April 18, 1939.  F. DURSCH  2,155,183
RECIPROCATING MOWER OR CUTTING MECHANISM
Filed Feb. 24, 1937   2 Sheets-Sheet 2
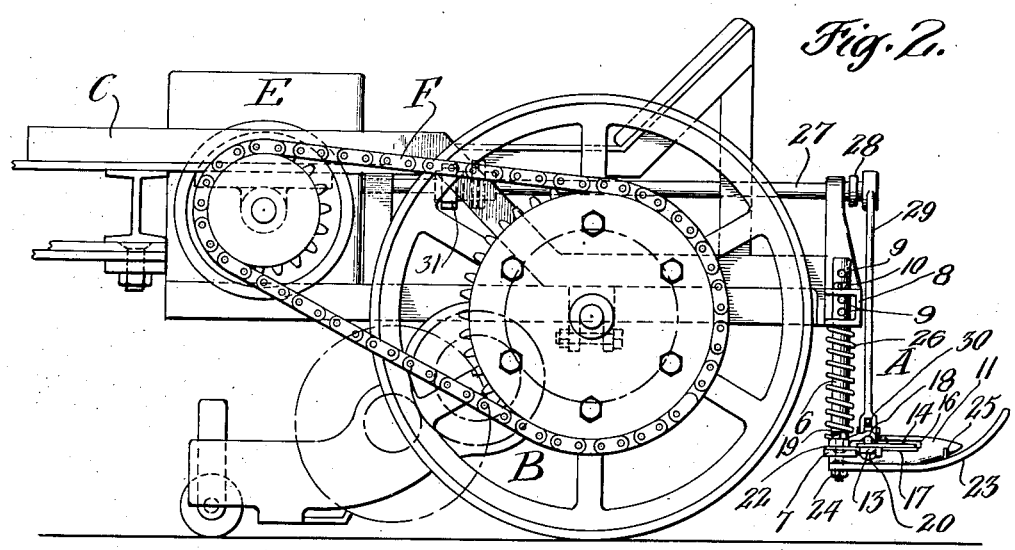
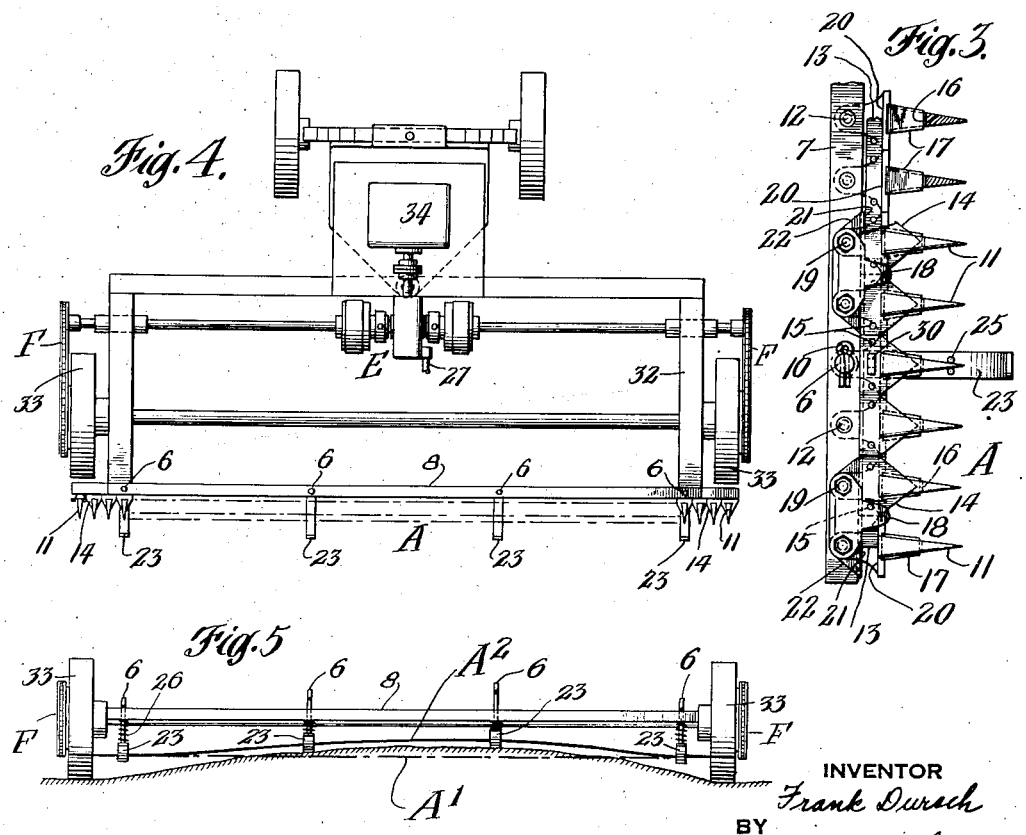
INVENTOR
Frank Dursch
BY
Synnestvedt & Lechner
ATTORNEYS Patented Apr. 18, 1939

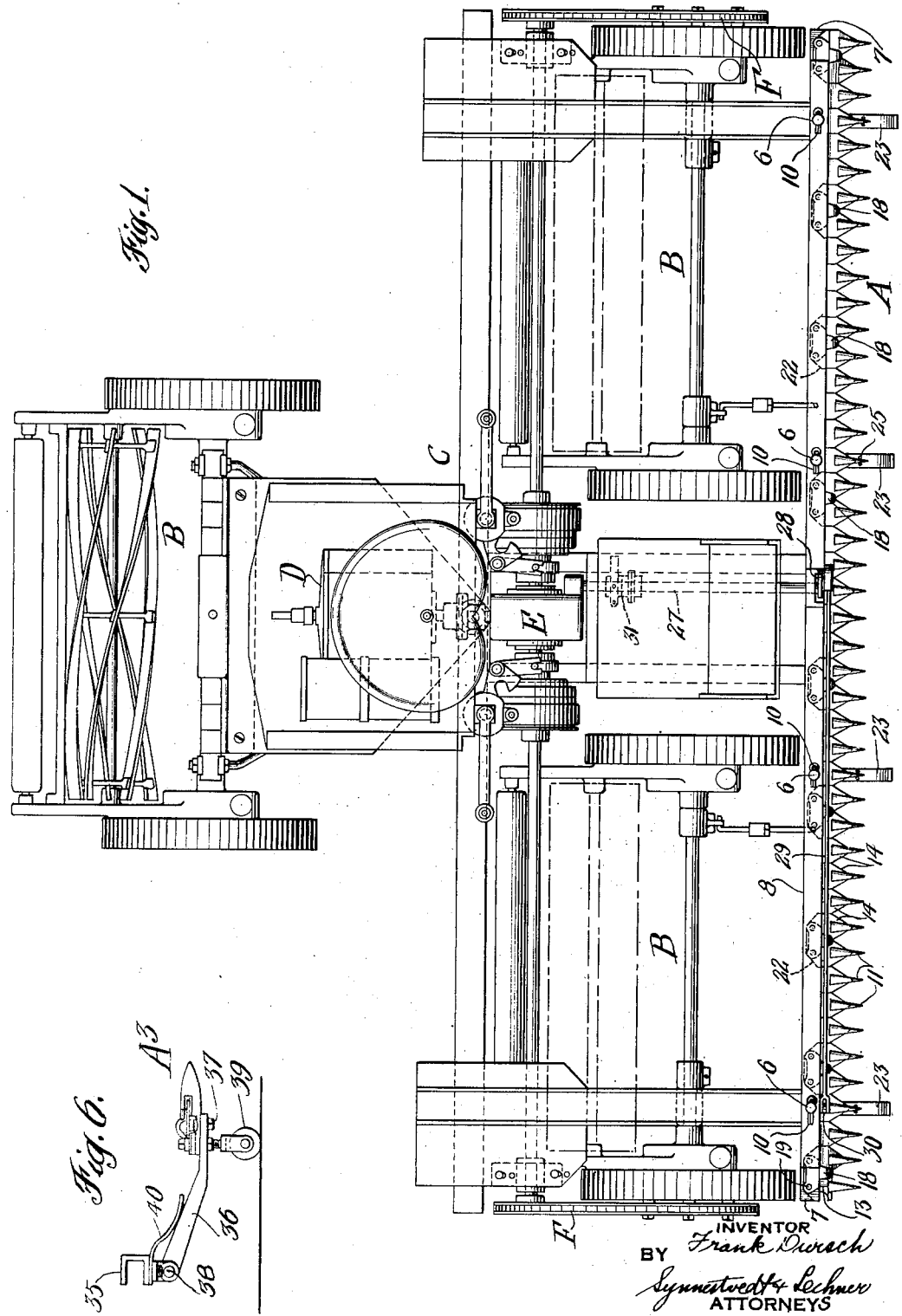

2,155,183

UNITED STATES PATENT OFFICE 2,155,183

RECIPROCATING MOWER OR CUTTING MECHANISM

Frank Dursch, Philadelphia, Pa.

Application February 24, 1937, Serial No. 127,344

10 Claims. (Cl. 56—6)

This invention relates to reciprocating mower or cutting mechanisms and has for its primary object the provision of a mower, cutter, or sickle of the reciprocating type which is adapted to effectively cut very wide swaths without cutting or injuring the turf.

Another object of my invention is the provision of a flexible reciprocating mower adapted to be self-accommodating to irregularities of ground surface, and to pass over obstructions of such character as would damage reciprocating mowers of the usual rigid or inflexible construction.

A further object of my invention is to provide a reciprocating mower of flexible construction which is particularly adapted for use with gang lawn mowers in which the several mower units of the gang are self-accommodating to irregularities of ground surface.

Still another object of the invention is the provision of a power driven reciprocating mower of the above character.

How the foregoing, together with such other objects and advantages as may hereinafter appear, or are incident to my invention, are realized, is illustrated in preferred form in the accompanying drawings, wherein Figure 1 is a plan view illustrating a reciprocating mower embodying my invention applied to a power gang lawn mower;

Figure 2 is an enlarged fragmentary side elevational view of the front portion of Figure 1;

Figure 3 is an enlarged fragmentary plan view illustrating certain details of construction;

Figure 4 is a more or less diagrammatic plan view illustrating another form of my invention;

Figure 5 is a front view of Figure 4 diagrammatically illustrating my improved reciprocating mower flexed to conform to undulating ground surface; and Figure 6 is a fragmentary side elevational view of another modification of the invention.

In the form of my invention illustrated in Figures 1 and 2, I have shown my improved reciprocating mower mechanism A associated with a gang lawn mower which may be of any well known form comprising in general a plurality of mower units B connected together in a manner that they will accommodate themselves to irregular or undulating ground surface. The particular gang mower which I have illustrated is the same as disclosed in my co-pending application Serial No. 122,525, filed January 27, 1937, and comprises three mower units B of standard rotary form, and framework C of articulated construction supported at the front on the two front mower units and at the rear on the rear mower units. The mower units are flexibly connected to the frame work so that they are free to tilt vertically with respect to the framework whereby they may readily accommodate themselves to irregular or undulating ground conditions. Drive is transmitted to the front mower units by means of a motor D, a clutch and driving unit E and sprocket and chain connections F in the manner described in my above mentioned co-pending application. The particular construction of the gang mower itself and the method of applying power for propulsion and rotary cutter operation are not part of this invention per se but are claimed in said co-pending application.

Referring now particularly to my reciprocating mower A, it will be seen that it is supported from the gang mower as by means of a plurality of arms or rods 6 secured to and extending upwardly from the flexible cutter or guard bar 7 of the device and passing through holes in the front frame member 8 of the gang mower, which member extends laterally of the mower for substantially the full width thereof. The rods 6 are provided with a plurality of spaced holes 9 for receiving cotter pins 10. These spaced holes permit of vertical adjustment of the mower mechanism A.

The mower mechanism comprises in general the cutter or guard bar 7 above referred to which is thin enough to be flexed and preferably constructed of spring steel, a multiplicity of pointed guards 11 secured thereto as by means of rivets 12, a sickle or knife bar 13 which also is thin enough to be flexed and preferably constructed of spring steel, and a multiplicity of knives or sickle sections 14 of flat, substantially triangular form arranged adjacent one another along the sickle bar and secured in place as by means of rivets 15.

The guards 11 are slotted at 16 to receive the knives or sickle sections 14 and are provided with cutter plates 17 which cooperate with the sharpened sickle sections 14 to effect cutting when the sickle bar is reciprocated, it being pointed out that the sickle sections or knives 14 are held in cutting relation with the cutter plates 17 by means of a plurality of knife clips 18 secured to the cutter bar 7 as by means of bolts 19, the knife clips being located at spaced intervals along the cutter bar 7. The sickle bar 13 is guided for reciprocatory movement at one side by means of the vertical surfaces 20 of the guards 11 and at its other side by means of the vertical surfaces 21 of a plurality of wearing plates 22 secured to the cutter bar 7 at spaced intervals therealong.

As has been pointed out above the cutter and sickle bars are thin enough to be flexed and preferably are of spring steel construction and this together with the fact that a multiplicity of relatively short sickle sections 14 are secured to the flexible sickle bar and that a corresponding multiplicity of guards 11 are secured to the flexible cutter bar enables the assembled cutter device to be readily flexed to follow the contour of irregular or undulating ground surface, as indicated in Figure 5, and this without interfering with the free reciprocation of the sickle or its effectiveness as a cutter or mower. It will be seen therefore that I have provided a flexible reciprocating cutter or sickle mechanism adapted to be curved to follow the contour of the ground and thereby prevent damage to the turf, and also one which will yield in passing over an obstacle so as to prevent damage to the mechanism.

In order to aid the cutter mechanism to follow ground undulations I employ a plurality of ground contacting shoes 23 spaced apart lengthwise of the mechanism and as shown in Figure 1 I have provided four such shoes. These shoes may be secured in place in any suitable manner, one simple way being to secure them to guards 11 as by means of a bolt 24 and positioning pins 25. In operation the shoes ride over irregularities or obstacles and cause the mechanism to flex or yield due to its flexible construction, thus making it conform to the irregularities or clear the obstacles as the case may be. As best seen in Figure 2 I employ compression springs 26 in association with the rods 6 adapted to have a cushioning effect and operating to urge the mechanism toward its normal straight position. In this connection it is pointed out that under certain conditions the sickle mechanism may be lifted bodily against the action of the springs 26. Thus I have provided a mounting for reciprocating sickle mechanisms of resilient or yieldable character which will yield under certain ground conditions and thus avoid damage to the sickle mechanism as well as to the turf.

The device A is power driven from a drive shaft 27 having connection with the motor D at one end and carrying a crank 28 at its other end. A connecting rod 29 is connected at one end to the crank 28 and at the other end to the reciprocable sickle bar 13 as indicated at 30 so that as the crank rotates reciprocatory motion is imparted to the sickle bar 13. The device A may be thrown into and out of operation as by means of a clutch 31 associated with the drive shaft 27.

In Figure 4 I have shown the device A carried at the front of a frame 32 having wheels 33 which may be driven by the motor 34. Reciprocatory motion may be imparted to the device in a manner similar to that described above. In this arrangement I do not associate rotary lawn mowers with the frame, it being pointed out that this arrangement is useful for cutting wide swaths of high grass or weeds where further cutting is not desired. When my mechanism is associated with a gang lawn mower it serves the purpose of cutting down long stemmed grass, weeds or other growth at a height where they will be effectively trimmed by the mowers of the following gang.

In Figure 5 I have diagrammatically illustrated how my flexible cutter mechanism may be flexed to follow the contour of the ground surface.

In Figure 6 I have shown a modification of my invention illustrating a reciprocating sickle mechanism $A^3$ attached to a frame member 35 of a gang mower or other vehicle by means of a plurality of arms 36 secured to the sickle mechanism in spaced relation lengthwise thereof as by means of bolts 37 and pivotally connected to the frame member 35 as indicated by the reference numeral 38. In this instance I employ ground contacting casters 39 in association with the sickle mechanisms which may be adjusted vertically in order to vary the height of cut. If desired, springs 40 may be associated with the pivoted arms 36 to yieldingly urge the casters 39 into ground contact. It is pointed out that such casters may be employed in the preferred form of my invention above described in place of the ground contacting shoes 23 or on the other hand the pivoted arms shown in Figure 6 may be provided with ground contacting shoe-like portions in place of the casters 39.

Some advantages of my invention will be better understood from the following. It has been the practice heretofore in reciprocating mower devices to employ cutter bars and frames of rigid construction and rigidly mounted so as to make the device rigid or inflexible and while such devices are satisfactory for cutting relatively narrow swaths in which ground undulations do not present difficulties they are not satisfactory for use in cutting wide swaths where the undulations are much greater, because if the device were set to cut the grass at a given height where the ground surface is level it would cut into or injure the turf wherever the undulations were higher than that given height. Injury to the turf would be extremely severe if it were attempted to use such a rigid device in association with a gang lawn mower in which the rotary mower units are flexibly connected together to enable them to be self-accommodating to irregularities of ground surface, because the rigid reciprocating cutter device would not be able to accommodate itself to the irregular surface and therefore the turf would be injured. This will be clear from inspection of Figure 5 in which the dot-and-dash line $A^1$ indicates a rigid cutter mechanism and shows how it would cut into and injure the turf with the same ground conditions under which my improved flexible cutter mechanism would not cause such injury, as shown by the full line $A^2$ which indicates my mechanism in its flexed condition.

I claim:

1. In combination with a gang lawn mower having a plurality of rotary cutter units, a frame to which said units are flexibly connected to permit movement thereof to accommodate undulating ground surface, a flexible reciprocating cutting mechanism supported from said frame forwardly and transversely of said cutter units and extending continuous for the full width of the gang mower, and ground contacting means carried by said cutting mechanism at spaced points along its length for causing it to be flexed to conform to the undulating ground surface.

2. In combination with a gang lawn mower having a plurality of rotary cutter units, a frame to which said units are flexibly connected to permit movement thereof to accommodate undulating ground surface, a flexible reciprocating cutting mechanism yieldingly supported from said frame forwardly and transversely of said cutter units, said cutting mechanism extending continuous for the full width of the gang mower.

3. In combination with a gang lawn mower having a plurality of rotary cutter units, a frame to which said units are flexibly connected to permit movement thereof to accommodate undulating ground surface, a cross member carried by said frame forwardly of said cutter units and extending for the full width of the gang mower, a reciprocating cutter mechanism extending continuous for the full width of and supported by said cross member, and means reacting from said cross member normally urging said cutter mechanism toward the ground.

4. In combination with a gang lawn mower having a plurality of rotary cutter units, a frame to which said units are flexibly connected to permit movement thereof to accommodate undulating ground surface, a cross member carried by said frame forwardly of said cutter units and extending continuous for the full width of the gang mower, a flexible reciprocating cutter mechanism hung from said cross member and coextensive therewith, a plurality of spaced shoe-like members carried by said cutter mechanism and adapted to contact the ground and cause the cutter mechanism to flex in accordance with undulating ground surface.

5. In combination with a gang lawn mower having a plurality of rotary cutter units arranged side by side to cut a wide swath; a flexible reciprocating cutting mechanism continuous in length for the width of said swath and supported by said gang lawn mower forwardly and transversely of said cutter units.

6. In combination with a gang lawn mower having a plurality of rotary cutter units arranged side by side to cut a wide swath; a flexible reciprocating cutting mechanism continuous in length for the width of said swath and supported by said gang lawn mower forwardly and transversely of said cutter units, and a plurality of ground contacting shoes carried by said cutter mechanism at spaced intervals along its length and operating to cause the cutter mechanism to be flexed to correspond to the contour of the ground.

7. A reciprocating cutting mechanism for gang lawn mowers comprising a flexible cutter bar, a flexible reciprocable sickle carried by said cutter bar, members extending upwardly from said flexible cutter bar adapted for attachment forwardly of the mower, said cutter bar and sickle extending transversely of the mower for the full width thereof, and means for imparting reciprocatory motion to the sickle.

8. A reciprocating cutting mechanism for gang lawn mowers comprising a flexible cutter bar, a flexible reciprocable sickle carried by said cutter bar, members extending upwardly from said flexible cutter bar adapted for attachment forwardly of the mower, said cutter bar and sickle extending transversely of the mower for the full width thereof, a plurality of ground contacting members carried by said cutter bar adapted to cause the cutter bar and sickle to flex in accordance with undulating ground surface, and means for imparting reciprocatory motion to the sickle.

9. In combination with a gang lawn mower having a frame, and a plurality of mower units connected thereto, said frame including a frame member located in front of the mower units and extending crosswise of the mower units at a level well above the ground, a flexible reciprocating sickle device of a length at least equal to the width of swath cut by the gang mower, a plurality of supporting members extending upwardly from said sickle device, and means associated with said supporting members for adjustably attaching said sickle device to said front member to extend across the front of the mower, and whereby the height of the sickle device above the ground may be adjusted, and a plurality of shoe-like members carried by said sickle device adapted to contact the ground and cause the sickle device to flex in accordance with ground undulations.

10. In a mower, a frame having wheels adapting it for ground travel, a reciprocating cutting mechanism located forwardly and transversely of said frame, a plurality of arms secured to said cutting mechanism, means pivotally connecting said arms to said frame, ground contacting means providing ground support for said mechanism, and spring means yieldably urging said mechanism toward the ground.

FRANK DURSCH.